(12) United States Patent
Vasek et al.

(10) Patent No.: US 9,719,785 B2
(45) Date of Patent: Aug. 1, 2017

(54) METHODS AND SYSTEMS FOR ROUTE-BASED DISPLAY OF METEOROLOGICAL FORECAST INFORMATION

(71) Applicant: HONEYWELL INTERNATIONAL SARL, Rolle (CH)

(72) Inventors: Jiri Vasek, Brno (CZ); Zdenek Eichler, Olomouc (CZ); Petr Tieftrunk, Brno (CZ); David Bajger, Havirov (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 119 days.

(21) Appl. No.: 14/601,560

(22) Filed: Jan. 21, 2015

(65) Prior Publication Data
US 2016/0209214 A1 Jul. 21, 2016

(51) Int. Cl.
*G01C 21/00* (2006.01)
*G01C 23/00* (2006.01)
(Continued)

(52) U.S. Cl.
CPC ............. *G01C 21/00* (2013.01); *G01C 23/00* (2013.01); *G01W 1/06* (2013.01); *G08G 5/0013* (2013.01);
(Continued)

(58) Field of Classification Search
None
See application file for complete search history.

(56) References Cited

U.S. PATENT DOCUMENTS

| 4,812,990 A | 3/1989 | Adams et al. |
| 4,862,373 A | 8/1989 | Meng |

(Continued)

FOREIGN PATENT DOCUMENTS

| EP | 2330583 A2 | 6/2011 |
| EP | 2541528 A2 | 1/2013 |

(Continued)

OTHER PUBLICATIONS

EP Extended Search Report for Application No. 16150976.5-1557 dated Jun. 17, 2016.
(Continued)

*Primary Examiner* — Genna Mott
(74) *Attorney, Agent, or Firm* — Lorenz & Kopf, LLP

(57) ABSTRACT

Methods and systems are provided for presenting forecast information pertaining to a planned route of travel, such as a flight plan. One exemplary method involves obtaining a plurality of forecast data sets associated with a plurality of different forecast time periods and subdividing a route into a plurality of forecast regions encompassing respective portions of the route based on the times associated with the navigational reference points defining the route. Each forecast region of the plurality of forecast regions is associated with a respective forecast time period. For each forecast region, a graphical representation of a subset of the forecast data set associated with that forecast region's associated forecast time period that corresponds to the geographic area of that forecast region is displayed on a display device concurrently to displaying a graphical representation of the route.

20 Claims, 4 Drawing Sheets

(51) Int. Cl.
*G08G 5/00* (2006.01)
*G01W 1/06* (2006.01)

(52) U.S. Cl.
CPC ......... *G08G 5/0021* (2013.01); *G08G 5/0052* (2013.01); *G08G 5/0091* (2013.01)

(56) References Cited

U.S. PATENT DOCUMENTS

| | | | |
|---|---|---|---|
| 5,265,024 A | 11/1993 | Crabill et al. | |
| 6,014,606 A | 1/2000 | Tu | |
| 6,289,277 B1 | 9/2001 | Feyereisen et al. | |
| 7,027,898 B1 | 4/2006 | Leger et al. | |
| 7,039,505 B1 | 5/2006 | Southard et al. | |
| 7,109,913 B1 | 9/2006 | Paramore et al. | |
| 7,363,152 B2 | 4/2008 | Sjanic | |
| 8,319,679 B2 | 11/2012 | Christianson | |
| 8,332,084 B1* | 12/2012 | Bailey | G01W 1/10 701/10 |
| 8,471,727 B2 | 6/2013 | Batsakes et al. | |
| 8,538,669 B2 | 9/2013 | Agarwal et al. | |
| 2002/0039072 A1 | 4/2002 | Gremmert et al. | |
| 2005/0049762 A1 | 3/2005 | Dwyer | |
| 2005/0171649 A1* | 8/2005 | Adachi | G01C 21/3691 701/1 |
| 2006/0293855 A1* | 12/2006 | Hammarlund | G01S 5/0072 701/301 |
| 2007/0179703 A1* | 8/2007 | Soussiel | G01C 21/12 701/532 |
| 2008/0021648 A1 | 1/2008 | Wilson | |
| 2009/0109065 A1 | 4/2009 | Pinheiro | |
| 2009/0204277 A1* | 8/2009 | Coulmeau | G01C 23/00 701/3 |
| 2010/0198489 A1 | 8/2010 | Rozovski et al. | |
| 2011/0029234 A1 | 2/2011 | Desai et al. | |
| 2011/0102192 A1* | 5/2011 | Batsakes | G08G 5/0021 340/905 |
| 2011/0208374 A1 | 8/2011 | Jayathirtha et al. | |
| 2012/0147030 A1 | 6/2012 | Hankers et al. | |
| 2013/0085669 A1 | 4/2013 | Bailey et al. | |
| 2014/0032103 A1 | 1/2014 | Kolbe et al. | |
| 2015/0332490 A1* | 11/2015 | Coulmeau | G06T 11/206 701/3 |

FOREIGN PATENT DOCUMENTS

| | | |
|---|---|---|
| GB | 2488916 A | 9/2012 |
| WO | 0236428 A2 | 5/2002 |
| WO | 2011128835 A2 | 10/2011 |

OTHER PUBLICATIONS

ChartCase Electronic Flight Bag Software; Essential to Every Mission; Nov. 13, 2014.
Garmin; Avionics and Flight Technology; Setting the course for Nextgen Air Navigation; 2012.
Frolik P., et al; Onboard Weather Radar Flight Strategy System With Bandwidth Management; U.S. Appl. No. 14/261,177, filed Apr. 24, 2014.
Scanlon, C.H.; A Graphical Weather System Design for the NASA Transport Systems Research Vehicle B-737; NASA Technical Memorandum 104205; Feb. 1992.
Tieftrunk, P. et al.; Aircraft Monitoring with Improved Situational Awareness; U.S. Appl. No. 14/462,886, filed Aug. 19, 2014.
Kommuri, S. et al.; Aircraft Monitoring with Improved Situational Awareness; U.S. Appl. No. 14/283,441, filed May 21, 2014.

* cited by examiner

METHODS AND SYSTEMS FOR ROUTE-BASED DISPLAY OF METEOROLOGICAL FORECAST INFORMATION

TECHNICAL FIELD

The subject matter described herein relates generally to avionics systems, and more particularly, embodiments of the subject matter relate to presenting meteorological forecast information relevant to a flight plan.

BACKGROUND

Pilots, air traffic controllers, airline personnel and the like routinely monitor meteorological data, reports, and forecasts to assess any potential impacts on the current or anticipated flight plan. Often, this involves manually selecting the particular meteorological forecasting product or service of interest, and then manually interacting with the selected forecasting product to focus on a geographic location of interest and select the relevant forecast information. Thus, to achieve a comprehensive understanding of the anticipated weather for the entire flight plan, a pilot must mentally piece together all the different forecasts that have been reviewed and effectively create a mental model of what the weather along the flight plan is expected to be. This can be particularly problematic when departure delays, changes to the flight plan, or other unanticipated events render the previously reviewed forecast information outdated or no longer applicable, thereby requiring the pilot to duplicate the earlier efforts to recreate the mental model of the relevant weather. Accordingly, it is desirable to reduce the mental workload of the pilot (or air traffic controller, or the like) and provide an accurate and reliable comprehensive view of the relevant weather forecast information.

BRIEF SUMMARY

Methods and systems are provided for presenting forecast information pertaining to a flight plan on a display device associated with an aircraft. One exemplary method involves a processing system obtaining a plurality of reference times associated with respective reference points associated with a flight plan, displaying a graphical representation of a flight path defined by the reference points on a map on the display device, and determining a plurality of forecast regions encompassing respective portions of the flight path based on the plurality of reference times. Each forecast region of the plurality of forecast regions is associated with a respective time period different from respective time periods associated with remaining forecast regions of the plurality of forecast regions. For each forecast region of the plurality of forecast regions, a subset of forecast data associated with the respective time period associated with the forecast region is obtained for a geographic area corresponding to the forecast region, and a graphical representation of the subset of forecast data on the map is provided on the map.

A system onboard an aircraft is also provided. The system includes a display device, a flight management system to maintain a flight plan comprising a sequence of reference points defining a flight path for the aircraft, a communications system coupled to a communications network, and a processing system coupled to the communications system, the display device, and the flight management system. Each reference point has a reference time associated therewith, resulting in a plurality of reference times corresponding to the sequence of reference points. The processing system displays a graphical representation of the flight path on a map on the display device and determines a plurality of forecast regions encompassing respective portions of the flight path based on the plurality of reference times. Each forecast region of the plurality of forecast regions corresponds to a different time period, and for each forecast region of the plurality of forecast regions, the processing system obtains, via the communications system, a subset of forecast data associated with the respective time period associated with the forecast region for a geographic area corresponding to the forecast region and displays a graphical representation of the subset of forecast data on the map.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
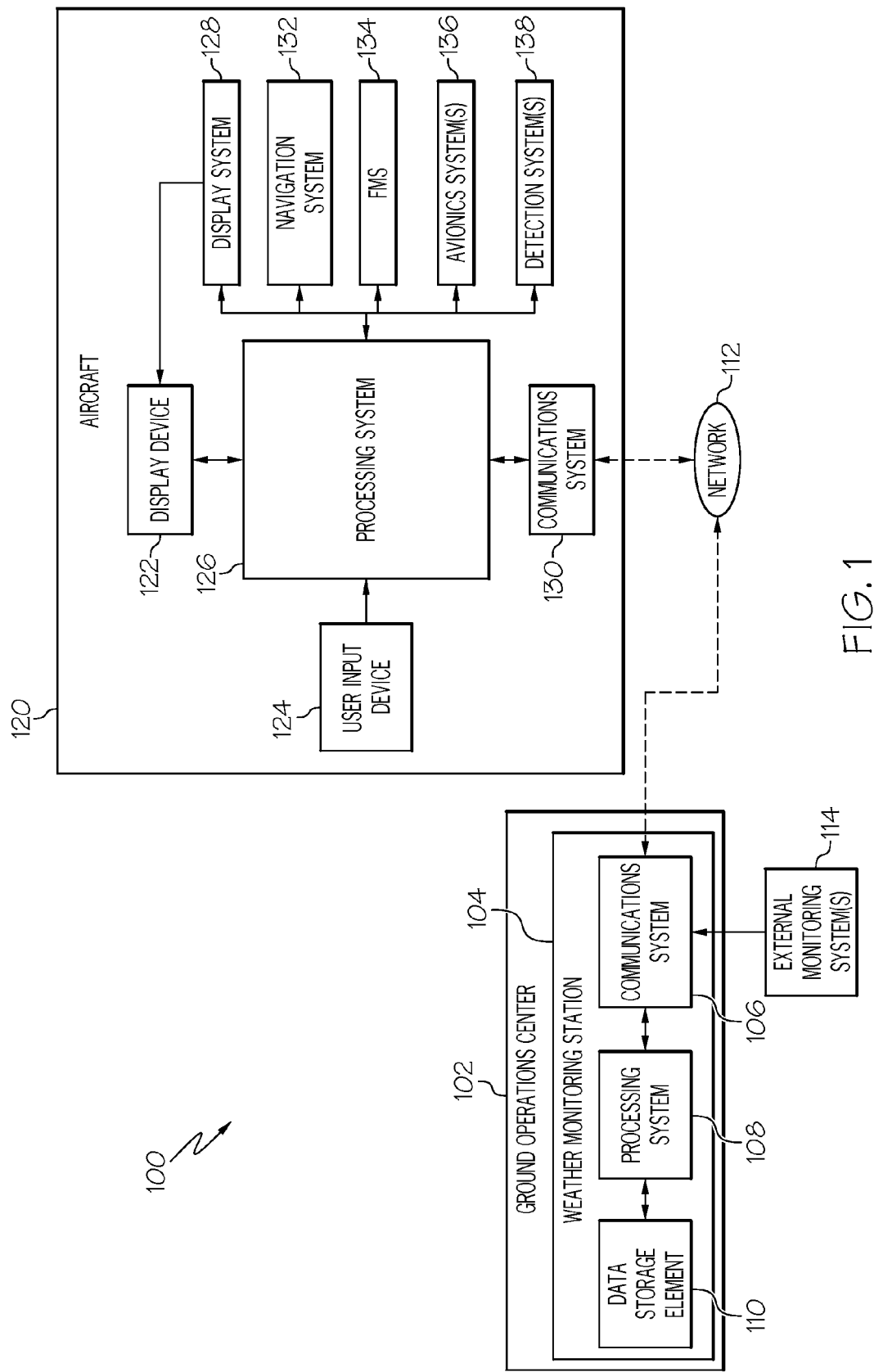
FIG. 1 is a block diagram of a weather monitoring system for an aircraft in an exemplary embodiment.

Embodiments of the subject matter described herein generally relate to systems and methods for generating a map display that includes comprehensive meteorological information pertaining to a flight plan by presenting meteorological forecast information for different time periods at their relevant geographic locations along the flight plan. Although the subject matter is described herein in the context of presenting forecasted meteorological conditions in aviation applications, it should be understood that the subject matter is not limited to any particular type of forecasted content being presented. Moreover, the subject matter described herein may be similarly utilized in other applications involving a predefined route for travel (e.g., a travel plan or travel route) or with another vehicle (e.g., automobiles, marine vessels, trains). That said, for purposes of explanation, but without limitation, the subject matter is described herein in the context of presenting comprehensive meteorological forecast information pertaining to a flight plan for an aircraft.

As described in greater detail below, in exemplary embodiments, the flight path (or route) defined by the navigational reference points of the flight plan is subdivided into a plurality of forecast regions (or forecast corridors) along the track of the flight path. Each forecast region corresponds to a geographic area that encompasses a respective portion of the flight path, and is associated with a time period corresponding to that encompassed portion of the flight path. In one or more embodiments, estimated arrival times associated with the navigational reference points of the flight plan are utilized to subdivide the flight path into time periods that correspond to forecast time periods for different forecast data sets available from an external monitoring system. In this regard, the forecast time period corresponds to the time frame that the respective set of meteorological forecast data is intended to represent; or, to put it another way, the forecast time period represents the particular timeframe during which forecast data within the data set may be considered to be valid or reliable.

In such embodiments, for each forecast region, a subset of forecast data corresponding to the geographic area of the forecast region is obtained from the forecast data set associated with the forecast time period that corresponds to the time period of the forecast region, and a graphical representation of that subset of forecast data is displayed on the map. A graphical representation of the flight path defined by the navigational reference points of the flight plan is also displayed on the map, with the forecast data for the different forecast time periods being concurrently displayed on the map along the flight path. By virtue of concurrently presenting forecast data for different forecast time periods along the flight path at the different portions of the flight path corresponding to the respective forecast time periods, a pilot or other user may simultaneously view the relevant forecasted meteorological conditions from those different forecast time periods in an intuitive manner with little or no manual interaction required.

In one or more embodiments, for each respective navigational reference point of a flight plan, the relevant meteorological forecast data for that geographic location is obtained using the meteorological forecast for a time period that corresponds, concurs, or otherwise overlaps with an estimated time of arrival associated with that navigational reference point. Thus, for each reference point, a meteorological forecast corridor encompassing the reference point may be determined using the meteorological forecast data that corresponds to the estimated time of arrival for that reference point. The forecasted meteorological conditions displayed on the map at the geographic areas corresponding to the different meteorological regions are generated based on temporally different meteorological forecast data corresponding to the different estimated arrival times for the different reference points.

FIG. 1 depicts an exemplary embodiment of a weather monitoring system 100 for an aircraft 120. The illustrated system 100 includes a weather monitoring station 104 at a ground operations center 102 that communicates with the aircraft 120 to provide meteorological information to the aircraft 120 for graphical presentation to a pilot, co-pilot, or other onboard personnel on a display device 122 onboard the aircraft 120, as described in greater detail below in the context of FIGS. 2-3.

In the illustrated embodiment of FIG. 1, the ground operations center 102 generally represents a facility located on the ground that includes one or more weather monitoring stations 104 equipped to track, analyze, and otherwise monitor meteorological conditions relevant to operations of one or more aircraft 120. In this regard, the weather monitoring station 104 generally represents a computer or other computing system at the ground operations center 102. In an exemplary embodiment, the weather monitoring station 104 includes, without limitation, a communications system 106, a processing system 108, and a data storage element 110. The communications system 106 generally represents the combination of hardware, firmware and/or other components configured to support communications between the weather monitoring station 104 and the aircraft 120. In exemplary embodiments, the communications system 106 includes an interface for communicatively coupling the weather monitoring station 104 to a communications network 112, such as the Internet, a satellite network, a cellular network, or the like, that supports communications to/from the aircraft 120. In some embodiments, the communications system 106 may also include hardware and/or other components configured to support data link communications to/from the aircraft 120 using a data link infrastructure and/or a data link service provider.

The illustrated communications system 106 also includes hardware, firmware and/or a combination thereof adapted to receive communications from one or more external monitoring system(s) 114, such as, for example, one or more external weather monitoring systems. In various embodiments, the external monitoring system(s) 114 may not be coupled to the network 112 and/or the information from the external monitoring system(s) 114 may not be available via the network 112. In some embodiments, the information from the external monitoring system(s) 114 may not be formatted or parameterized for transmission to and/or receipt by the onboard aircraft processing system 126 or for processing and/or presentation by the aircraft processing system 126. In other embodiments, the information from the external monitoring system(s) 114 may not be available at or within the current geographic location (or area) for the aircraft 120, or the information from the external monitoring system(s) 114 may not be available for the current geographic location (or area) for the aircraft 120.

Depending on the embodiment, one or more external weather monitoring system(s) 114 may include or otherwise be realized as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. In some embodiments, the meteorological information provided by an external weather monitoring system 114 may include forecast meteorological data that is generated based on historical trends and/or other weather observations, and may include forecasted meteorological data for geographical areas that are beyond the range of any weather detection systems 138 onboard the aircraft 120. In other embodiments, the processing system 108 may store or otherwise maintain historic meteorological data previously received from an external weather monitoring system 114, with the processing system 108 calculating or otherwise determining forecast meteorological for geographic areas of interest to the aircraft 120 based on the stored meteorological data and the current (or most recently received) meteorological data from the external weather monitoring system 114. In exemplary embodiments, an external weather monitoring system 114 provides current and/or forecast meteorological data for a relatively large geographic area (e.g., across an entire continent) that encompasses at least a portion of the projected flight plan for the aircraft 120. In this regard, the meteorological information from the external weather monitoring system 114 may be operationally used to obtain a "big picture" strategic view of the current weather phenomena and trends in its changes in intensity and/or movement.

In an exemplary embodiment, the processing system 108 generally represents the hardware, circuitry, processing logic, and/or other components configured to receive or otherwise obtain meteorological data from one or more external monitoring systems 114 (e.g., via communications system 106), provide meteorological data pertaining to the current flight plan of the aircraft 120 to the aircraft 120 (e.g., via communications systems 106, 130), and perform additional processes, tasks and/or functions to support operation of the monitoring system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein.

In practice, the processing system 108 includes processing logic that may be configured to carry out the functions, techniques, and processing tasks associated with the operation of the monitoring system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element 110, such as a memory or any other suitable non-transitory short or long term storage media or other computer-readable medium, which is capable of storing computer-executable programming instructions or other data for execution that, when read and executed by the processing system 108, cause the processing system 108 to execute and perform one or more of the processes tasks, operations, and/or functions described herein. Additionally, the data storage element 110 may store or otherwise maintain meteorological data received from the external monitoring system(s) 114 as needed to support the processes described herein.

Still referring to FIG. 1, in an exemplary embodiment, the aircraft 120 includes, without limitation, a display device 122, a user input device 124, a processing system 126, a display system 128, a communications system 130, a navigation system 132, a flight management system (FMS) 134, one or more avionics systems 136, and one or more detection systems 138. The display device 122 is an electronic display capable of graphically displaying flight information or other data associated with operation of the aircraft 120 under control of the display system 128 and/or processing system 126. In this regard, the display device 122 is coupled to the display system 128 and the processing system 126, wherein the processing system 126 and the display system 128 are cooperatively configured to display, render, or otherwise convey one or more graphical representations or images associated with operation of the aircraft 120 on the display device 122. As described in greater detail below, in exemplary embodiments, a navigational map that includes a graphical representation of a route associated with a flight plan of the aircraft 120 along with graphical representations of forecasted meteorological data relevant to the route is displayed, rendered, or otherwise presented on the display device 122.

The user input device 124 is coupled to the processing system 126, and the user input device 124 and the processing system 126 are cooperatively configured to allow a user (e.g., a pilot, co-pilot, or crew member) to interact with the display device 122 and/or other elements onboard the aircraft 120. Depending on the embodiment, the user input device 124 may be realized as a keypad, touchpad, keyboard, mouse, touch panel (or touchscreen), joystick, knob, line select key or another suitable device adapted to receive input from a user, such as a microphone, audio transducer, audio sensor, or another audio input device.

The processing system 126 generally represents the hardware, circuitry, processing logic, and/or other components configured to facilitate communications and/or interaction with the weather monitoring station 104 (e.g., via communications system 130 and network 112) and perform additional processes, tasks and/or functions to support operation of the monitoring system 100, as described in greater detail below. Depending on the embodiment, the processing system 126 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 126 includes processing logic that may be configured to carry out the functions, techniques, and processing tasks associated with the operation of the monitoring system 100 described in greater detail below. Furthermore, the steps of a method or algorithm described in connection with the embodiments disclosed herein may be embodied directly in hardware, in firmware, in a software module executed by the processing system 126, or in any practical combination thereof. In accordance with one or more embodiments, the processing system 126 includes or otherwise accesses a computer-readable medium, such as a memory or another suitable non-transitory short or long term storage media, which is capable of storing computer-executable programming instructions or other data for execution that, when read and executed by the processing system 126, cause the processing system 126 to execute and perform one or more of the processes tasks, operations, and/or functions described herein. In some embodiments, the display device 122, the user input device 124, and/or the processing system 126 may be implemented as an electronic flight bag that is separate from the aircraft 120 but capable of being communicatively coupled to the other elements of the aircraft 120 when onboard the aircraft 120.

The display system 128 generally represents the hardware, firmware, and/or other components configured to control the display and/or rendering of one or more displays pertaining to operation of the aircraft 120 and/or systems 130, 132, 134, 136, 138 on the display device 122 (e.g., synthetic vision displays, navigational maps, and the like). In this regard, the display system 128 may access or include one or more databases suitably configured to support operations of the display system 128, such as, for example, a terrain database, an obstacle database, a navigational database, a geopolitical database, a terminal airspace database, a special use airspace database, or other information for rendering and/or displaying content on the display device 122. In this regard, in addition to including a graphical representation of terrain, a navigational map displayed on the display device 122 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map.

Still referring to FIG. 1, in an exemplary embodiment, the navigation system 132 provides real-time navigational data and/or information regarding operation of the aircraft 120 to the processing system 126 and/or display system 128 to support rendering display(s) on the display device 122. The navigation system 132 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 132, as will be appreciated in the art. In exemplary embodiments, the navigation system 132 is capable of obtaining and/or determining the instantaneous position of the aircraft 120, that is, the current (or instantaneous) location of the aircraft 120 (e.g., the current latitude and longitude) and the current (or instantaneous) altitude (or above ground level) for the aircraft 120. The navigation system 132 is also capable of obtaining or otherwise determining the heading of the aircraft 120 (i.e., the direction the aircraft is traveling in relative to some reference).

In the illustrated embodiment, the processing system 126 is coupled to the communications system 130, which is configured to support communications to and/or from the aircraft 120 via the network 112. In this regard, the communications system 130 includes an interface for communicatively coupling the aircraft 120 and/or processing system 126 to the communications network 112 that supports communications to/from the aircraft 120 via the network 112. In some embodiments, the communications system 106 may also include a data link system or another suitable radio communication system that supports communications between the aircraft 120 and the weather monitoring station 104. Additionally, the communications system 130 may also support communications between the aircraft 120 and air traffic control or another command center or ground location. The processing system 126 is also coupled to the FMS 134, which is coupled to the navigation system 132, the communications system 130, and one or more additional avionics systems 136 to support navigation, flight planning, and other aircraft control functions in a conventional manner, as well as to provide real-time data and/or information regarding the operational status of the aircraft 120 to the processing system 126. In one or more exemplary embodiments, the FMS 134 stores or otherwise maintains information pertaining to the scheduled flight plan (or flight path) for the aircraft 120, so that the processing system 126 may render or otherwise display the projected flight path for the aircraft 120 on the navigational map in conjunction with displaying forecasted meteorological data relevant to the projected flight path on the map.

In the illustrated embodiment, the onboard detection system(s) 138 generally represents the component(s) of the aircraft 120 that are coupled to the processing system 126 and/or the display system 128 to generate or otherwise provide information indicative of various objects or regions of interest within the vicinity of the aircraft 120 that are sensed, detected, or otherwise identified by a respective onboard detection system 138. For example, an onboard detection system 138 may be realized as a weather radar system or other weather sensing system that measures, senses, or otherwise detects meteorological conditions in the vicinity of the aircraft 120 and provides corresponding radar data (e.g., radar imaging data, range setting data, angle setting data, and/or the like) to one or more of the other onboard systems 126, 128, 130, 132, 134, 136 for further processing and/or handling. For example, the processing system 126 and/or the display system 128 may generate or otherwise provide graphical representations of the meteorological conditions identified by the onboard detection system 138 on the display device 122 (e.g., on or overlying a lateral navigational map display). In another embodiment, an onboard detection system 138 may be realized as a collision avoidance system that measures, senses, or otherwise detects air traffic, obstacles, terrain and/or the like in the vicinity of the aircraft 120 and provides corresponding detection data to one or more of the other onboard systems 126, 128, 130, 132, 134, 136.

It should be understood that FIG. 1 is a simplified representation of the monitoring system 100 for purposes of explanation and ease of description, and FIG. 1 is not intended to limit the application or scope of the subject matter described herein in any way. Practical embodiments of the monitoring system 100 and/or aircraft 120 will include numerous other devices and components for providing additional functions and features, as will be appreciated in the art. In practice, the aircraft 120 will likely include numerous avionics systems not illustrated in FIG. 1 for obtaining and/or providing real-time flight-related information that may be displayed on the display device 122 or otherwise provided to a user (e.g., a pilot, a co-pilot, or crew member). For example, practical embodiments of the aircraft 120 will likely include one or more of the following avionics systems suitably configured to support operation of the aircraft 120: an air traffic management system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system. Additionally, although FIG. 1 shows a single display device 122, in practice, additional display devices may be present onboard the aircraft 120. Lastly, it should be noted that in other embodiments, features and/or functionality of processing system 126 described herein can be implemented by or otherwise integrated with the features and/or functionality provided by the display system 128 or the FMS 134. In other words, some embodiments may integrate the processing system 126 with the display system 128 or the FMS 134; that is, the processing system 126 described herein may be a component of the display system 128 and/or the FMS 134.

Figure 2:
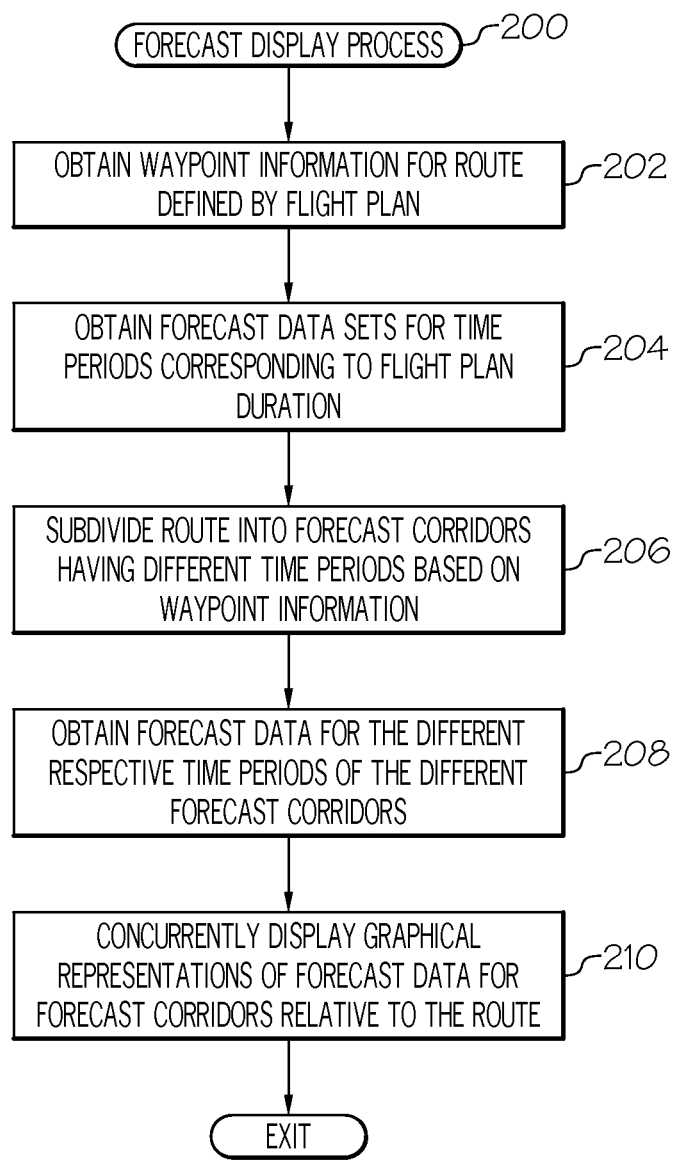
FIG. 2 is a flow diagram of an exemplary forecast display process suitable for use with the aircraft in the monitoring system of FIG. 1 in accordance with one or more embodiments.

Referring now to FIG. 2, in an exemplary embodiment, the monitoring system 100 is configured to support a forecast display process 200 and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the forecast display process 200 may be performed by different elements of the monitoring system 100, such as, the communications system 106, the processing system 108, the external monitoring system(s) 114, the display device 122, the user input device 124, the processing system 126, the display system 128, the communications system 130 and/or the FMS 134. It should be appreciated that the forecast display process 200 may include any number of additional or alternative tasks, the tasks need not be performed in the illustrated order and/or the tasks may be performed concurrently, and/or the forecast display process 200 may be incorporated into a more comprehensive procedure or process having additional functionality not described in detail herein. Moreover, one or more of the tasks shown and described in the context of FIG. 2 could be omitted from a practical embodiment of the forecast display process 200 as long as the intended overall functionality remains intact.

Still referring to FIG. 2, and with continued reference to FIG. 1, in an exemplary embodiment, the forecast display process 200 begins by identifying or otherwise obtaining information pertaining to the sequence of navigational reference points that define the projected flight path or route associated with the aircraft's flight plan (task 202). In this regard, the processing system 126 retrieves or otherwise obtains waypoint information identifying one or more of the geographic location (e.g., latitude and longitude), the altitude (or above ground level or flight level), and a travel time (e.g., an estimated or scheduled time of arrival) associated with each navigational reference point. Depending on the particular flight plan and type of air navigation, the navigational reference points may include waypoints, navigational aids, such as VHF omni-directional ranges (VORs), distance measuring equipment (DMEs), tactical air navigation aids (TACANs), and combinations thereof (e.g., VORTACs), landing and/or departure locations (e.g., airports, airstrips, runways, landing strips, heliports, helipads, and the like), points of interest or other features on the ground, as well as position fixes (e.g., initial approach fixes (IAFs) and/or final approach fixes (FAFs)) and other navigational reference points used in area navigation (RNAV). For example, a flight plan may include an initial or beginning reference point (e.g., a departure or takeoff location), a final or destination navigational reference point (e.g., an arrival or landing location), and one or more intermediate navigational reference points (e.g., waypoints, positional fixes, and the like) that define the desired path or route for the aircraft 120 from the initial navigational reference point to the final navigational reference point. In this regard, the intermediate navigational reference points may define one or more airways for the aircraft 120 en route to the final navigational reference point. The navigational reference points of the flight plan may be associated with geographic information that identifies their real-world geographic positions, such as, for example, the latitude, the longitude, and the planned altitude (or above ground level) for the aircraft 120 at that navigational reference point. For purposes of explanation, the navigational reference points of the flight plan may be referred to herein as waypoints, however, it should be understood that the subject matter is not intended to be limited to any particular type of navigational reference point being used to define the flight path of the flight plan.

In addition to obtaining the positional information (e.g., geographic location and altitude) associated with the waypoints of the flight plan, the waypoint information obtained by the forecast display process 200 also includes the time associated with each waypoint of the flight plan. In exemplary embodiments, the time associated with each waypoint of the aircraft's flight plan is realized as the estimated time of arrival for when the aircraft 120 is expected or scheduled to traverse that waypoint. The estimated time of arrival for a particular waypoint may be calculated or otherwise determined based at least in part on a departure time associated with the initial waypoint of the flight plan and/or the estimated time of arrival for the preceding waypoint in the flight plan, the geographic position of the respective waypoint relative to the initial waypoint and/or the preceding waypoint, the planned cruise speeds for the aircraft 120 during execution of the flight plan prior to traversing the respective waypoint, the anticipated wind speeds to be encountered by the aircraft 120 during execution of the flight plan prior to traversing the respective waypoint, and the like. In some embodiments, the estimated arrival times may be calculated or otherwise determined by the FMS 134 and maintained by the FMS 134 in association with the waypoints of the flight plan. In other embodiments, the processing system 126 may obtain the flight plan sequence information, geographic information and other identification information (e.g., waypoint names) for the waypoints from the FMS 134 along with the planned cruise speeds associated with the different reference points (or segments) of the flight plan from the FMS 134, and utilize the information obtained from the FMS 134 to calculate the estimated arrival times for the reference points of the flight plan.

In exemplary embodiments, the forecast display process 200 continues by obtaining meteorological forecast data sets for time periods that correspond to the duration of the flight plan (task 204). In this regard, a set of meteorological forecast data may be associated with a particular time (or time period) for which the forecast is considered to be valid or reliable. For example, an external weather monitoring system 114 may generate or otherwise provide forecast data sets for three hour time intervals (e.g., 1200Z-1500Z, 1500Z-1800Z, and the like). Based on the initial departure time associated with the flight plan and the anticipated arrival time associated with the flight plan, the processing system 126 may transmit or otherwise provide, to the weather monitoring station 104, a request for forecast data sets having an associated time (or time period) that concurs or otherwise overlaps, as least in part, with the flight plan for the aircraft 120. In response to receiving the request, the processing system 108 may request or otherwise obtain forecast data sets from the external monitoring system(s) 114 having forecast time periods that overlap or otherwise correspond to the flight plan duration, and in response to receiving the requested forecast data sets, provide the obtained forecast data sets to the processing system 126 via the network 112. Alternatively, the processing system 108 may calculate or otherwise determine forecast data sets that correspond to the flight plan duration based on the current meteorological data from the external monitoring system(s) 114 and/or stored historic meteorological data from the external monitoring system(s) 114, and provide the determined forecast data sets to the processing system 126 via the network 112.

In exemplary embodiments, the forecast display process 200 continues by subdividing or otherwise partitioning the flight path into different meteorological forecast regions (or corridors) having corresponding geographic areas that overlap or otherwise encompass the different waypoints of the flight plan based on the obtained waypoint information (task 206). In this regard, using the estimated arrival times, the forecast display process 200 may determine different meteorological forecast regions (or corridors) that effectively subdivide the flight path into different segments that correspond to the different valid time periods for the different forecast data sets. As described in greater detail below, meteorological forecast data for the geographic area of a meteorological forecast region encompassing a particular portion of the flight path is obtained from the forecast data set corresponding to the time period associated with that encompassed portion of the flight path and utilized to generate a graphical representation of the forecasted meteorological conditions proximate to that portion of the flight plan for the expected period of time during which the aircraft 120 will be traversing that flight plan segment.

In one or more embodiments, for each waypoint of the flight plan, the processing system 126 calculates or otherwise determines a geographic area that extends in front of and behind that waypoint along the route or path defined by the flight plan. The geographic area also extends perpendicular to the route or path defined by the flight plan to circumscribe, surround, or otherwise encompass the waypoint. The geographic area represents a forecast corridor corresponding to the portion of a meteorological forecast data set to be associated with that waypoint. In this regard, each waypoint may have a meteorological forecast corridor associated therewith, with the different meteorological forecast corridors being combined in a piecemeal manner to encompass the entire flight path of the flight plan. As described in greater detail below in the context of FIG. 3, in exemplary embodiments, the width of the forecast corridor perpendicular to the route or path defined by the flight plan is calculated or otherwise determined based at least in part on the time associated with the respective waypoint in the flight plan. Additionally, the length of the forecast corridor parallel to the route or path defined by the flight plan may be determined based on the associated times and geographic locations of consecutive waypoints in the flight plan relative to one another.

For each forecast corridor, the forecast display process 200 retrieves or otherwise obtains meteorological forecast data corresponding to the geographic area of the forecast corridor from the forecast data set associated with the time (or time period) that the forecast corridor is associated with, and concurrently displays graphical representations of the meteorological forecast data for the different meteorological forecast corridors on a navigational map in conjunction with displaying the flight path or route of the flight plan (tasks 208, 210). For example, using the estimated arrival time for a waypoint associated with a forecast corridor, the processing system 126 may identify the forecast data set having an associated forecast time period that overlaps the estimated arrival time and select, from that identified forecast data set, the subset of meteorological forecast data corresponding to the geographic area of that forecast corridor. Thereafter, the processing system 126 generates a graphical representation of that subset of meteorological forecast data, which is presented or otherwise displayed on a navigational map on the display device 122 at or within the geographic area corresponding to the forecast corridor. In exemplary embodiments, the navigational map on the display device 122 includes a graphical representation of the flight plan (e.g., graphical representations of the waypoints and the line segments of the route that interconnects them) that overlies and/or underlies the graphical representations of the meteorological forecast data, thereby providing a pilot with a view of the temporally-relevant forecasted meteorological conditions along the entire length of the planned flight path.

Figure 3:
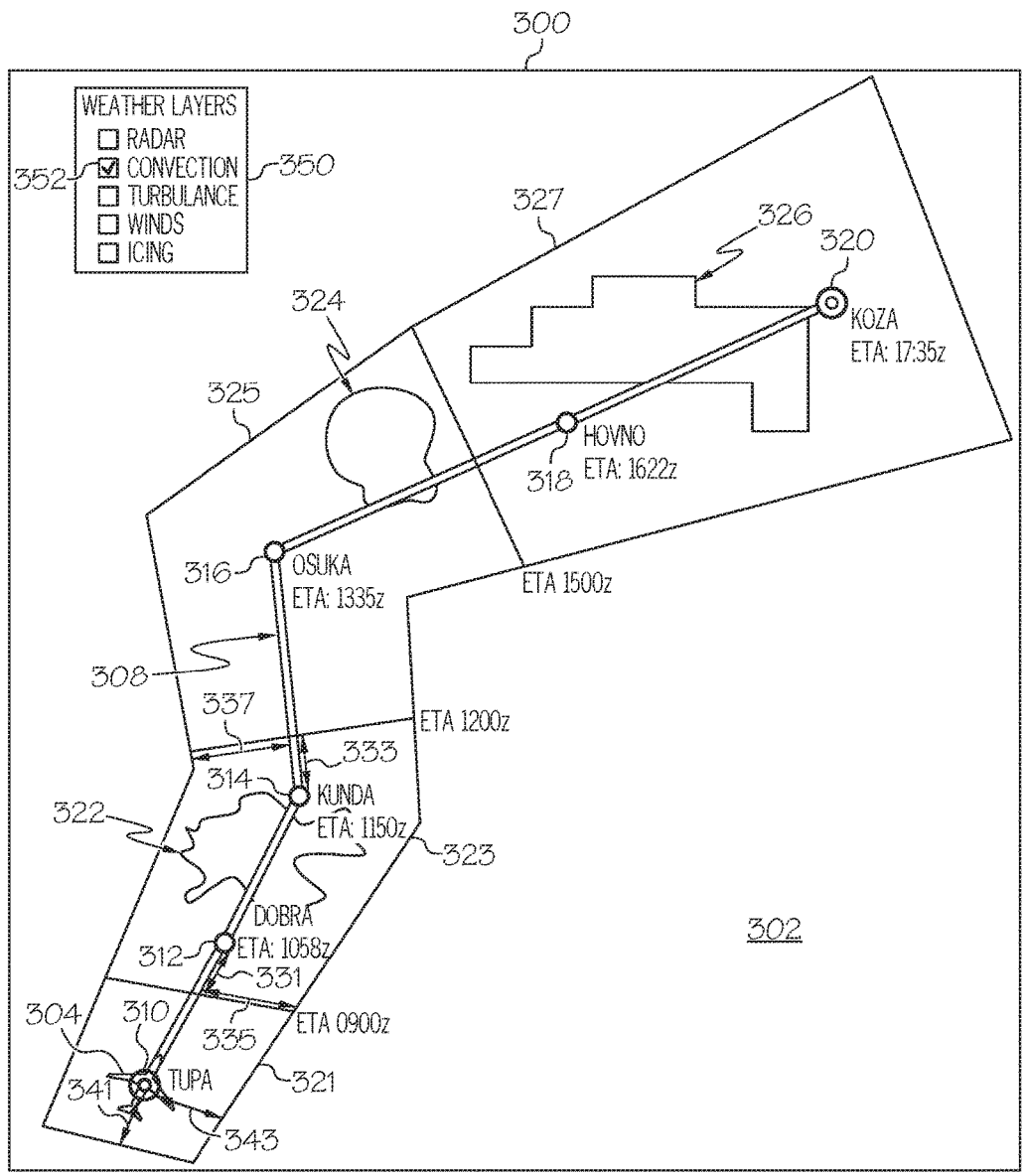
FIG. 3 depicts an exemplary navigational map display including comprehensive forecast information for a flight plan that is suitable for display on a display device associated with the aircraft in the monitoring system of FIG. 1 in accordance with one or more embodiments of the exemplary forecast display process of FIG. 2.

FIG. 3 depicts an exemplary navigational map 300 that may be displayed or otherwise presented on the display device 122 onboard the aircraft 120 in accordance with one exemplary embodiment of the forecast display process 200 of FIG. 2. In one or more embodiments, the navigational map 300 is realized as a flight plan summary map that is presented in response to the pilot or other user onboard the aircraft 120 manipulating the user input device 124 to select a GUI element corresponding to the flight plan summary display from among a plurality of possible navigational displays that may be presented. In one or more embodiments, the processing system 126 and/or the display system 128 obtains the navigational reference points for the flight plan from the FMS 134, calculates or otherwise determines a geographic area that encompasses the flight plan, and then generates a terrain background 302 for the flight plan summary map 300. In this regard, the terrain background 302 graphically represents the terrain, topology, and geopolitical information for the geographic area depicted in the map 300. As illustrated, the display area may be adjusted to provide a border region and/or buffer inside the perimeter of the display area, so that the content displayed overlying the terrain background 302 does not abut the edges of the navigational map 300.

A graphical representation of the projected flight path 308 for the aircraft 120 is also generated based on the navigational reference points of the flight plan and displayed on the flight plan summary map 300 overlying the terrain background 302. The graphical representation of the flight path 308 includes graphical representations 310, 312, 314, 316, 318, 320 of the individual navigational reference points of the flight plan that define the flight path 308 along with graphical representations of the navigational segments between consecutive navigational reference points of the flight plan. In the illustrated embodiment, the processing system 126 and/or the display system 128 also obtains the current location of the aircraft 120 (e.g., from the navigation system 132) and displays the graphical representation 304 of the aircraft 120 that is positioned overlying the terrain background 302 in a manner that accurately reflects the current location and heading of the aircraft 120. In this regard, FIG. 3 depicts a flight plan summary map 300 where the aircraft 120 is currently located at the initial departure location of the flight plan.

Referring to FIG. 3 and with continued reference to FIGS. 1-2, the flight plan summary map 300 includes graphical representations 322, 324, 326 of forecasted meteorological conditions for different meteorological forecast regions having different temporal associations. The illustrated flight plan summary map 300 includes a legend 350 containing a plurality of GUI elements that are selectable by a user (e.g., using a cursor or pointer associated with the user input device 124) to select or otherwise indicate the particular type of meteorological conditions that the user would like to view. In this regard, FIG. 3 depicts a GUI element 352 (e.g., a checkbox) that is selected by the pilot indicate the particular type of meteorological condition (e.g., convection regions) that the pilot would like to view along the projected flight path 308. In response to identifying selection of the convection GUI element 352, the processing system 126 obtains forecast data sets corresponding to forecasted convective activity for a geographic area that overlaps or otherwise includes the projected flight path 308 for the different time periods that overlap or otherwise concur with the anticipated time period during which the aircraft 120 will be executing the flight plan. For example, the processing system 126 may request and obtain the forecast data sets via the network 112 from the weather monitoring station 104. Depending on the embodiment, the weather monitoring station 104 may obtain the forecast data sets from the external monitoring system 114, or alternatively, the weather monitoring station 104 may calculate or otherwise determine the forecast data sets for the respective time periods based on information pertaining to convective activity identified, detected, or otherwise forecasted by an external weather monitoring system 114.

As described above in the context of FIG. 2, the processing system 126 may determine different meteorological forecast regions (or corridors) 321, 323, 325, 327 that effectively subdivide the length of the projected flight path 308. In this regard, each forecast corridor 321, 323, 325, 327 may be associated with a respective time period associated with an obtained forecast data set and overlap or otherwise encompass waypoints of the flight plan having an associated arrival time that falls within the range of that forecast time period. For example, for a forecast data set having an associated time period for which the forecast data is valid of 0900Z-1200Z, the processing system 126 may identify or otherwise determine the waypoints 312, 314 having estimated arrival times within that forecast time period. In the illustrated embodiment, the processing system 126 identifies the DOBRA waypoint 312 with an estimated time of arrival of 1058Z and the KUNDA waypoint 314 with an estimated time of arrival of 1150Z as being within the 0900Z-1200Z forecast time period.

Based on the estimated arrival times for the identified waypoints 312, 314, the geographic locations of those identified waypoints 312, 314 with respect to the preceding waypoint 310 and the successive waypoint 316 of the flight plan, and/or the times associated with those preceding and successive waypoints 310, 316, the processing system 126 calculates or otherwise determines a geographic area for the forecast corridor 323 to be populated with forecast data from the 0900Z-1200Z forecast data set. For example, based on the 1150Z estimated arrival time for the KUNDA waypoint 314 and one or more of the 1335Z estimated arrival time for the OSUKA waypoint 316 and the along track distance between the KUNDA waypoint 314 and the OSUKA waypoint 316, the processing system 126 calculates or otherwise determines a length 333 by which the exit boundary of the forecast corridor 323 extends beyond the KUNDA waypoint 314. In this regard, the length 333 corresponds to an along track distance beyond the KUNDA waypoint 314 that the aircraft 120 is expected to traverse by the end of the forecast time period, such that the boundary of the forecast corridor 323 distal to the departure waypoint 310 corresponds to the estimated aircraft location at the end of the 0900Z-1200Z forecast time period. In various embodiments, the processing system 126 may account for forecasted wind speeds, planned cruise speeds, differences in altitude levels for the waypoints 314, 316 dictated by the flight plan, and/or other variables when calculating the length 333 that the forecast corridor 323 should extend beyond the KUNDA waypoint 314. Similarly, the processing system 126 calculates or otherwise determines a length 331 by which the entrance boundary of the forecast corridor 323 extends before the DOBRA waypoint 312.

In exemplary embodiments, the processing system 126 also calculates or otherwise determines a width 335, 337 of the forecast corridor 323 perpendicular to the projected flight path 308 based on the difference between the forecast time period and the current time. In this regard, the further into the future the valid forecast time period is relative to the current time, the more likely it is that the actual meteorological conditions at that forecast time period will deviate from the forecasted meteorological conditions, either in terms of location or intensity. Accordingly, the widths of the forecast corridors 321, 323, 325, 327 may increase along the flight path 308 towards the destination waypoint 320. In the illustrated embodiment, the width of each forecast corridor 321, 323, 325, 327 progressively increases from an initial width at its respective entrance boundary to a final width at its respective exit boundary. For example, the processing system 126 may calculate an initial width 335 for the forecast corridor 323 (e.g., 50 nautical miles) based on the time difference between the current time and the beginning forecast time of 0900Z corresponding to when the aircraft 120 is expected to enter the corridor 323. Similarly, the processing system 126 may calculate a final width 337 for the forecast corridor 323 (e.g., 100 nautical miles) based on the time difference between the current time and the ending forecast time of 1200Z corresponding to when the aircraft 120 is expected to exit the corridor 323. Additionally, in some embodiments, the processing system 126 may calculate intermediate widths for the forecast corridor 323 at the locations of the encompassed waypoints 312, 314 (or other virtual waypoints constructed along the flight path 308). Thus, the geographic area of a forecast corridor 321, 323, 325, 327 may be different from the geographic areas of the remaining forecast corridors 321, 323, 325, 327, and in some embodiments, the geographic areas may progressively increase along the flight path.

After determining the geographic extents of the forecast corridor 323 corresponding to the 0900Z-1200Z forecast data set, the processing system 126 selects or otherwise identifies the subset of the meteorological forecast data from the 0900Z-1200Z forecast data set that corresponds to the geographic area encompassed by the forecast corridor 323 and generates a graphical representation 322 of that subset of the 0900Z-1200Z forecast data on the map 300. Thus, the only portion of the data from the 0900Z-1200Z forecast data set presented on the map 300 may be the portion that corresponds to the meteorological forecast region 323 that encompasses the portions of the flight path 308 where the aircraft 120 is expected to be during the relevant forecast time period.

In a similar manner, for the forecast data set having an associated time period of 1200Z-1500Z, the processing system 126 may identify or otherwise determine the OSUKA waypoint 316 having an estimated arrival time of 1335Z is within that forecast time period. Based on the estimated arrival time for the OSUKA waypoint 316, its geographic location with respect to the preceding waypoint 314 and the successive waypoint 318 of the flight plan, and/or the times associated with those preceding and successive waypoints 314, 318, the processing system 126 calculates or otherwise determines a geographic area for the forecast corridor 325 to be populated with forecast data from the 0900Z-1200Z forecast data set. The processing system 126 may identify the exit boundary of the preceding 0900Z-1200Z forecast corridor 323 as the entrance boundary to the 1200Z-1500Z forecast corridor 325. In a similar manner as described above, the processing system 126 may determine the exit boundary for the 1200Z-1500Z forecast corridor 325 by calculating an along track distance beyond the OSUKA waypoint 316 where the aircraft 120 is expected to be located at the end of the forecast time period (e.g., the estimated location of the aircraft 120 at 1500Z).

The processing system 126 also calculates a width of the forecast corridor 325 perpendicular to the projected flight path 308 based on the difference between the forecast time period and the current time. In the illustrated embodiment, the width of the 1200Z-1500Z forecast corridor 325 is greater than the width of the preceding 0900Z-1200Z forecast corridor 323. The processing system 126 may set the width of the forecast corridor 325 at its entrance boundary to be equal to the width 337 of the preceding forecast corridor 323 at its adjacent exit boundary. As described above, the width of the 1200Z-1500Z forecast corridor 325 may progressively increase from its initial width at its respective entrance boundary (e.g., 100 nautical miles) to a final width at its respective exit boundary (e.g., 150 nautical miles), which may be calculated based on the time difference between the current time and the ending forecast time of 1500Z corresponding to when the aircraft 120 is expected to exit the corridor 325. After determining the geographic extents of the 1200Z-1500Z forecast corridor 325, the processing system 126 selects or otherwise identifies the subset of meteorological forecast data from the 1200Z-1500Z forecast data set that corresponds to the geographic area encompassed by the forecast corridor 325 and generates a graphical representation 324 of that subset of the 1200Z-1500Z forecast data on the map 300. Again, in exemplary embodiments, the only portion of the data from the 1200Z-1500Z forecast data set that is presented on the map 300 is the portion that corresponds to the 1200Z-1500Z forecast region 325 that encompasses the flight path 308. Thus, only the 1200Z-1500Z forecast data that is most likely to be relevant is presented on the map 300, while the remaining forecast data from the 1200Z-1500Z forecast data set is not presented on the flight plan summary map 300.

As illustrated in FIG. 3, the processing system 126 identifies or otherwise determines additional forecast corridors 321, 327 associated with different forecast time periods until the entirety of the flight path 308 is covered or otherwise encompassed by an overlapping forecast corridor 321, 327. In exemplary embodiments, a buffer area is added to the initial and final forecast corridors 321, 327 at the endpoints of the flight plan. For example, the processing system 126 may extend the boundary of the initial forecast corridor 321 opposite the exit boundary of the corridor 321 along the path defined by the initial TUPA waypoint 310 and the succeeding waypoint 312 of the flight plan by a fixed distance. In other embodiments, the processing system 126 may calculate or otherwise determine the length 341 by which the boundary of the initial forecast corridor 321 extends before the initial TUPA waypoint 310 based on the time difference between the current time and the estimated departure time. In this regard, the distance 341 between the departure waypoint 310 341 and the boundary may be equal to the width 343 of the corridor 321 at the departure waypoint 310 341. Similarly, the processing system 126 may extend the boundary of the final forecast corridor 327 beyond the final KOZA waypoint 320 along the path defined by the KOZA waypoint 320 and the preceding waypoint 318 of the flight plan by a fixed distance, or alternatively, calculate a length by which the boundary of the final forecast corridor 327 extends beyond the final KOZA waypoint 320 based on the time difference between the current time and the estimated arrival time.

Still referring to FIG. 3, after determining the geographic extents of the 0900Z-0900Z forecast corridor 321 and the 1500Z-1800Z forecast corridor 327, the processing system 126 selects or otherwise identifies the subsets of meteorological forecast data from the relevant forecast data sets and generates graphical representations of those subsets of data at their corresponding geographic locations on the map 300. In this regard, FIG. 3 depicts an embodiment where there 0600Z-0900Z forecast data set does not include any forecasted convective activity within the geographic area corresponding to the 0900Z-0900Z forecast corridor 321. Thus, the map 300 may not include any graphical representations of forecasted convective activity from 0600Z-0900Z forecast data set.

In one or more exemplary embodiments, the meteorological forecast data displayed in the different forecast corridors is rendered with different levels of image resolution or detail based upon the time difference between the current time and the time period associated with the respective forecast corridor. Again, the further into the future the valid forecast time period is relative to the current time, the more likely it is that the actual meteorological conditions at that forecast time period will deviate from the forecasted meteorological conditions. Thus, the more imminent meteorological forecast data is rendered with a higher image resolution or granularity, while meteorological forecast data further into the future may be rendered with a lower image resolution. For example, the graphical representation 322 of the data corresponding to the forecasted convective activity within the 0900Z-1200Z forecast corridor 323 may be rendered with a higher image resolution than the graphical representation 324 of the data corresponding to the forecasted convective activity within the 1200Z-1500Z forecast corridor 325, which, in turn, may be rendered with a higher image resolution than the graphical representation 326 of the data corresponding to the forecasted convective activity within the 1500Z-1800Z forecast corridor 327. Accordingly, the image resolution of the displayed forecast data may progressively decrease when moving along the projected flight path 308 from the departure waypoint 310 to the destination waypoint 320.

Figure 4:
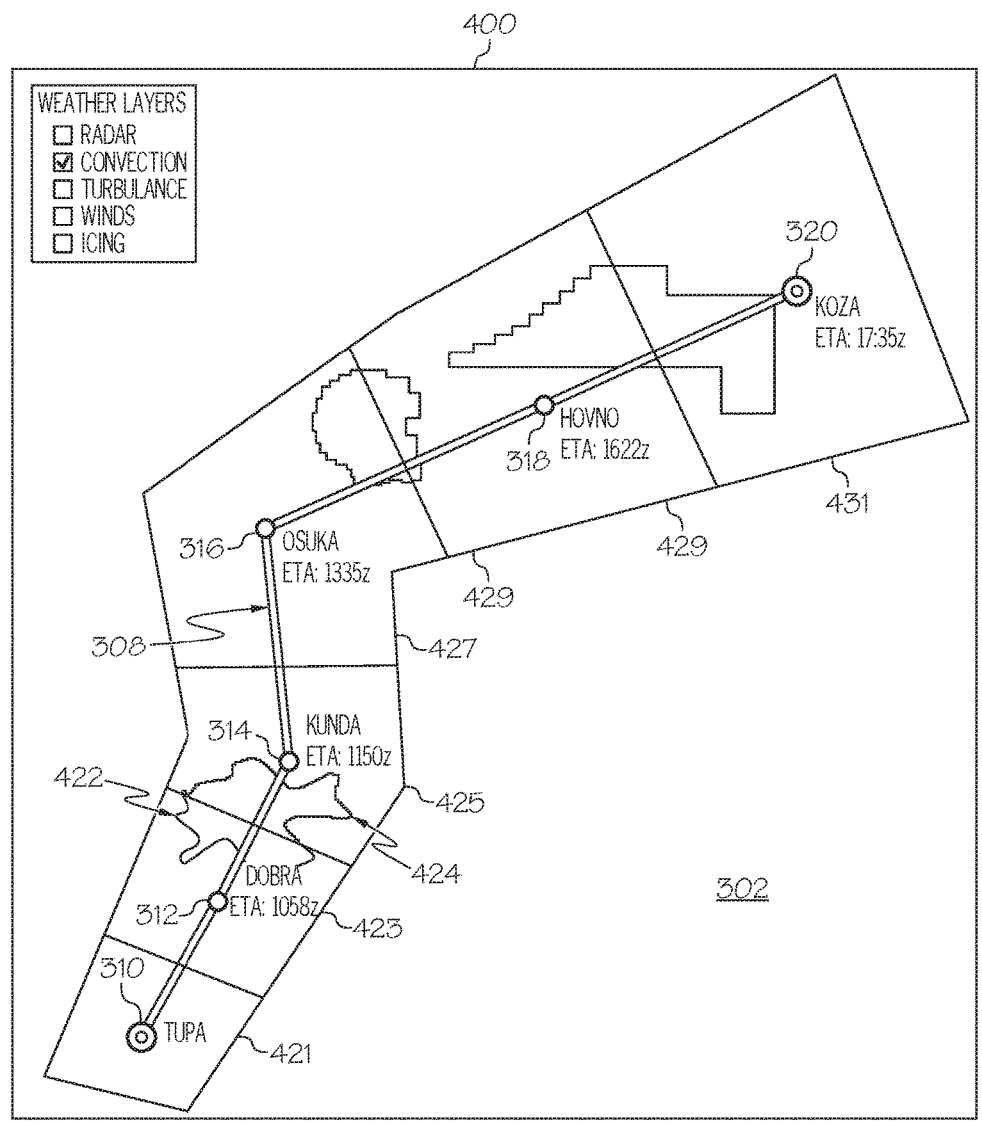
FIG. 4 depicts another embodiment of a navigational map display including comprehensive forecast information for a flight plan that is suitable for display on a display device associated with the aircraft in the monitoring system of FIG. 1 in accordance with one or more embodiments of the exemplary forecast display process of FIG. 2.

Turning now to FIG. 4, while the subject matter is described above in the context of subdividing the flight plan according to the available forecast time periods with reference to FIG. 3, in alternative embodiments, forecast data sets with different forecast time periods may be fused, integrated, combined, or otherwise adjusted to create virtual forecast data sets with different forecast time periods than are available from the external monitoring system(s) 114 and/or the weather monitoring station 104. For example, the projected flight path 308 may be subdivided into a plurality of meteorological forecast corridors 421, 423, 425, 427, 429, 431, where each of the meteorological forecast corridors 421, 423, 425, 427, 429, 431 is associated with a respective waypoint 310, 312, 314, 316, 318, 320 of the flight plan. For example, a DOBRA forecast corridor 423 may extend from the midpoint between the TUPA and DOBRA waypoints 310, 312 to the midpoint between the DOBRA and KUNDA waypoints 312, 314, a KUNDA forecast corridor 425 may extend from the midpoint between the DOBRA and KUNDA waypoints 312, 314 to the midpoint between the KUNDA and OSUKA waypoints 314, 316, and so on. In such embodiments, each forecast corridor 421, 423, 425, 427, 429, 431 may be associated with the estimated time of arrival for its associated waypoint 310, 312, 314, 316, 318, 320. For example, the DOBRA forecast corridor 423 may be associated with the 1058Z estimated arrival time associated with the DOBRA waypoint 312, the KUNDA forecast corridor 425 may be associated with the 1150Z estimated arrival time associated with the KUNDA waypoint 314, and so on.

In the embodiment of FIG. 4, to populate a forecast corridor 421, 423, 425, 427, 429, 431 with meteorological forecast data, the processing system 126 may fuse, integrate, combine, adjust, or otherwise modify forecast data sets to construct a virtual forecast data set associated with estimated arrival time of the respective forecast corridor 421, 423, 425, 427, 429, 431. For example, to populate the DOBRA forecast corridor 423, the processing system 126 may adjust or otherwise modify the subset of meteorological forecast data for the DOBRA forecast corridor 423 from the 0900Z-1200Z forecast data set using the corresponding subset(s) of meteorological forecast data for the DOBRA forecast corridor 423 from the 0600Z-0900Z forecast data set and/or the 1200Z-1500Z forecast data set to obtain a virtual forecast data set corresponding to the estimated arrival time for the DOBRA waypoint 312. The processing system 126 generates or otherwise provides a graphical representation 422 of the adjusted meteorological forecast data from the virtual forecast data set on the navigational map 400, and in exemplary embodiments, with an image resolution corresponding to the time difference between the DOBRA waypoint 312 arrival time and the current time. Similarly, to populate the KUNDA forecast corridor 425, the processing system 126 may adjust the subset of meteorological forecast data for the KUNDA forecast corridor 423 from the 0900Z-1200Z forecast data set with corresponding subset(s) of meteorological forecast data from other forecast data sets to obtain a virtual forecast data set corresponding to the 1150Z arrival time for the KUNDA waypoint 314, and generate a graphical representation 424 of the adjusted meteorological forecast data from the virtual forecast data set on the navigational map 400 with an image resolution corresponding to the time difference between the KUNDA waypoint 314 arrival time and the current time.

It should be appreciated that the above-described embodiments of FIGS. 3-4 are merely some examples of how the subject matter described herein may be implemented, and numerous variations exist. For example, in some embodiments, a flight plan may be subdivided into a number of virtual navigational reference points corresponding to the various forecast time periods available. For example, based on the navigational reference points of the flight plan and their estimated arrival times, the flight plan may be subdivided into virtual waypoints corresponding to the midpoints of the available forecast time periods (e.g., a 1030Z waypoint for the 0900Z-1200Z forecast time period, a 1330Z waypoint for the 1200Z-1500Z forecast time period, and so on). In such embodiments, the meteorological forecast corridors may be effectively centered on the virtual waypoints and populated with the relevant forecast data for the associated forecast time period. In yet other embodiments, a flight plan may be subdivided into a number of virtual navigational reference points corresponding to fixed increments of travel time (or alternatively, fixed increments of travel distance) along the track of the flight path. For example, virtual waypoints may be identified along the projected flight path for every 10 minutes of travel time (or every 10 nautical miles along the projected flight path). Meteorological forecast corridors encompassing the virtual waypoints may then be determined and associated with the estimated arrival time for its associated virtual waypoint. Thereafter, for each virtual waypoint, forecast data from one or more forecast data sets may be fused, integrated, or otherwise combined to create a virtual forecast data set associated with the estimated arrival time for its associated virtual waypoint, with the virtual data set being utilized to populate the forecast corridor associated with the respective virtual waypoint.

Although the subject matter is described herein in the context of meteorological forecast data, the subject matter is not intended to be limited to the particular type of content being displayed on the map. For example, the forecast display process 200 described above may be implemented in an equivalent manner to present forecasted graphical representations based on information obtained from one or more aviation monitoring systems. For example, forecasted aviation monitoring data may be determined based at least in part on forecasted information available from an aviation monitoring system, such as a SIGMET reporting system (or data feed), NOTAM reporting system (or data feed), an aircraft report (AIREP) reporting system (or data feed), an airmen's meteorological information (AIRMET) reporting system (or data feed), a METAR monitoring system, an aircraft situation display to industry (ASDI) reporting system (or data feed), a central flow management unit (CMFU), an automatic dependent surveillance-broadcast (ADS-B) system, or the like.

For the sake of brevity, conventional techniques related to graphics and image processing, image fusion, flight planning, meteorological forecasting, monitoring systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of presenting forecast information pertaining to a flight plan on a display device associated with an aircraft, the method comprising:
   obtaining, by a processing system, a plurality of reference times, each respective reference time of the plurality being associated with a respective reference point of a plurality of reference points associated with the flight plan, the plurality of reference points defining a flight path for the flight plan;
   displaying, by the processing system, a graphical representation of the flight path on a map on the display device;
   determining, by the processing system, a plurality of forecast regions encompassing respective portions of the flight path based on the plurality of reference times, each forecast region of the plurality of forecast regions being associated with a respective time period different from respective time periods associated with remaining forecast regions of the plurality of forecast regions; and
   for each forecast region of the plurality of forecast regions:
      obtaining, by the processing system, a subset of forecast data associated with the respective time period associated with the forecast region for a geographic area corresponding to the forecast region;
      determining, for the respective forecast region of the plurality of forecast regions, a respective image resolution for the respective forecast region based on the respective time period associated with the forecast region; and
      rendering, by the processing system, a graphical representation of the subset of forecast data for the respective forecast region on the map with the respective image resolution, resulting in a plurality of graphical representations of the subsets of forecast data associated with the plurality of forecast regions being concurrently displayed with a plurality of different image resolutions.

2. The method of claim 1, further comprising obtaining, by the processing system, a plurality of forecast data sets corresponding to a plurality of different forecast time periods, each forecast data set being associated with a respective forecast time period different from respective forecast time periods associated with remaining forecast data sets, wherein:
   determining the plurality of forecast regions comprises subdividing the flight path into the plurality of forecast regions based on the plurality of different forecast time periods and the plurality of reference times, each forecast region being associated with a respective forecast time period of the plurality of different forecast time periods.

3. The method of claim 2, wherein obtaining the subset of forecast data associated with the respective forecast time period associated with the forecast region comprises obtaining forecast data for the geographic area corresponding to the forecast region from the forecast data set of the plurality of forecast data sets associated with that respective forecast time period of the plurality of different forecast time periods.

4. The method of claim 1, wherein:
   determining the plurality of forecast regions comprises, for each respective reference point of the plurality of reference points, determining a respective geographic area encompassing the respective reference point; and
   obtaining the subset of forecast data comprises obtaining the subset of forecast data associated with the respective time period associated with the forecast region for the respective geographic area encompassing the respective reference point.

5. The method of claim 4, wherein obtaining the subset of forecast data comprises determining the subset of forecast data associated with the respective reference time associated with the respective reference point encompassed by the respective forecast region of the plurality of forecast regions based on one or more forecast data sets associated with one or more forecast time periods different from the respective reference time.

6. The method of claim 1, wherein determining the plurality of forecast regions further comprises determining, for each forecast region of the plurality of forecast regions, a respective width of the geographic area corresponding to the forecast region based on the respective time period associated with the forecast region.

7. The method of claim 1, wherein respective image resolution for the respective forecast region corresponds to a time difference between the respective time period associated with the forecast region and a current time.

8. The method of claim 7, further comprising determining, for each forecast region of the plurality of forecast regions, a respective width of the geographic area corresponding to the forecast region based on a difference between the respective time period associated with the forecast region and the current time, wherein:
   the respective image resolutions for the respective forecast regions progressively decrease along the flight path; and
   the respective widths for the geographic areas of the respective forecast regions progressively increase along the flight path.

9. The method of claim 1, further comprising determining, for each forecast region of the plurality of forecast regions, a respective width of the geographic area corresponding to the forecast region by:
   calculating an initial width for the respective forecast region based on a first time difference between a current time and a beginning forecast time corresponding to when the aircraft is expected to enter the respective forecast region; and
   calculating a final width for the respective forecast region based on a second time difference between the current time and an ending forecast time corresponding to when the aircraft is expected to exit the respective forecast region, resulting in the geographic areas corresponding to the plurality of forecast regions progressively increasing along the flight path.

10. A non-transitory computer-readable medium having computer-executable instructions or data stored thereon executable by the processing system to perform the method of claim 1.

11. A system onboard an aircraft, the system comprising:
   a display device;
   a flight management system to maintain a flight plan comprising a sequence of reference points defining a flight path, each reference point having a reference time associated therewith, resulting in a plurality of reference times corresponding to the sequence of reference points;
   a communications system coupled to a communications network; and a processing system coupled to the communications system, the display device, and the flight management system to:
  display a graphical representation of the flight path on a map on the display device;
  determine a plurality of forecast regions encompassing respective portions of the flight path based on the plurality of reference times, each forecast region of the plurality of forecast regions corresponding to a different time period; and
  for each forecast region of the plurality of forecast regions:
    obtain, via the communications system, a subset of forecast data associated with the respective time period associated with the forecast region for a geographic area corresponding to the forecast region;
    determine, for the respective forecast region of the plurality of forecast regions, a respective image resolution for the respective forecast region based on the respective time period associated with the forecast region; and
    display a graphical representation of the subset of forecast data on the map with the respective image resolution, resulting in a plurality of graphical representations of the subsets of forecast data associated with the plurality of forecast regions being concurrently displayed with a plurality of different image resolutions.

12. The system of claim 11, the processing system obtaining a plurality of forecast data sets provided by an external monitoring system via the communications system, the plurality of forecast data sets corresponding to a plurality of different forecast time periods, wherein the subset of forecast data is obtained from the respective forecast data set having an associated forecast time period corresponding to the respective time period associated with the respective forecast region.

13. The system of claim 11, wherein:
  each forecast region of the plurality of forecast regions comprises a different respective geographic area encompassing a respective reference point of the reference points; and
  the subset of forecast data for each forecast region comprises a subset of forecast data associated with the respective reference time associated with the respective reference point encompassed by the respective forecast region for the respective geographic area encompassing the respective reference point.

14. The system of claim 13, the processing system obtaining a plurality of forecast data sets provided by an external monitoring system via the communications system, the plurality of forecast data sets corresponding to a plurality of different forecast time periods, wherein the processing system determines the subset of forecast data for each forecast region based on one or more forecast data sets of the plurality.

15. The system of claim 11, wherein a respective width of the geographic area corresponding to the respective forecast region is determined by the processing system based at least in part on the respective time period associated with the respective forecast region.

16. A method of presenting meteorological forecast information pertaining to a route on a display device, the method comprising:
  obtaining, by a processing system, a plurality of arrival times, each respective arrival time of the plurality of arrival times being associated with a respective reference point of a plurality of reference points that define the route;
  displaying, by the processing system, a graphical representation of the route on a map on the display device;
  obtaining, by the processing system, a plurality of forecast data sets associated with a plurality of different forecast time periods, each forecast data set of the plurality of forecast data sets comprising meteorological forecast data associated with a respective forecast time period of the plurality of different forecast time periods;
  subdividing the route into a plurality of forecast regions encompassing respective portions of the route based on the plurality of arrival times, each forecast region of the plurality of forecast regions being associated with a respective forecast time period of the plurality of different forecast time periods;
  determining, for each forecast region of the plurality of forecast regions, a respective image resolution for the respective forecast region based at least in part on the respective forecast time period of the respective forecast region; and
  for each forecast region of the plurality of forecast regions, displaying, on the map, a graphical representation of a subset of the forecast data set associated with the respective forecast time period of the respective forecast region, the subset comprising portions of the meteorological forecast data of the forecast data set corresponding to a geographic area of the respective forecast region, wherein:
    the graphical representation of the subset of the meteorological forecast data for each forecast region is rendered with the respective image resolution determined for the respective forecast region;
    the respective image resolutions for the respective forecast regions progressively decrease along the route; and
    the graphical representations associated with the respective forecast regions of the plurality of forecast regions are concurrently displayed.

17. The method of claim 16, further comprising determining, for each forecast region of the plurality of forecast regions, a respective width perpendicular to the route for the geographic area of the respective forecast region based at least in part on the respective forecast time period of the respective forecast region.

18. The method of claim 17, wherein the respective widths for the geographic areas of the respective forecast regions progressively increase along the route.

19. The method of claim 18, wherein the respective width for the geographic area of the respective forecast region progressively increases from an initial width at its respective entrance boundary to a final width at its respective exit boundary.

20. The method of claim 16, the route comprising a projected flight path for a flight plan of an aircraft having the processing system and the display device onboard, wherein obtaining the plurality of forecast data sets comprises obtaining the plurality of forecast data sets from an external monitoring system via a communications network.

* * * * *